United States Patent
Song et al.

(10) Patent No.: US 8,155,381 B2
(45) Date of Patent: Apr. 10, 2012

(54) VEHICLE HEADLIGHT DETECTING METHOD AND APPARATUS, AND REGION-OF-INTEREST SEGMENTING METHOD AND APPARATUS

(75) Inventors: Chunyan Song, Shenyang (CN); Wei Liu, Shenyang (CN); Huai Yuan, Shenyang (CN)

(73) Assignee: Alpine Electronics, Inc., Tokyo (JP)

( * ) Notice: Subject to any disclaimer, the term of this patent is extended or adjusted under 35 U.S.C. 154(b) by 778 days.

(21) Appl. No.: 12/341,193

(22) Filed: Dec. 22, 2008

(65) Prior Publication Data

US 2009/0169105 A1 Jul. 2, 2009

(30) Foreign Application Priority Data

Dec. 27, 2007 (CN) .......................... 2007 1 0301433

(51) Int. Cl.
*G06K 9/00* (2006.01)
(52) U.S. Cl. ....................................... 382/103; 348/148
(58) Field of Classification Search .......... 382/103–107; 348/148–149
See application file for complete search history.

(56) References Cited

U.S. PATENT DOCUMENTS

| | | | |
|---|---|---|---|
| 6,828,903 B2 | 12/2004 | Watanabe et al. | |
| 7,460,951 B2 * | 12/2008 | Altan et al. | 701/536 |
| 7,894,631 B2 * | 2/2011 | Kakinami | 382/103 |
| 2002/0116106 A1 * | 8/2002 | Breed et al. | 701/45 |
| 2005/0058323 A1 * | 3/2005 | Brodsky | 382/104 |
| 2006/0018513 A1 * | 1/2006 | Sogawa | 382/106 |
| 2009/0092284 A1 * | 4/2009 | Breed et al. | 382/103 |

FOREIGN PATENT DOCUMENTS

JP 09-073529 3/1997

* cited by examiner

*Primary Examiner* — Jingge Wu
(74) *Attorney, Agent, or Firm* — Brinks Hofer Gilson & Lione (57) ABSTRACT

A method and apparatus for detecting vehicle headlights and a region-of-interest (ROI) segmenting method and apparatus are disclosed. The ROI segmenting method includes: performing an edge extracting operation on a captured image to obtain edges of the captured image; selecting edges meeting predetermined criteria from the obtained edges, the predetermined criteria being the similarity between the region surrounded by the selected edges and the pattern formed by a vehicle headlight in physical reality at a position of the selected edges; determining the region surrounded by the selected edges within the captured image as a vehicle headlight pattern; and segmenting the ROI which potentially includes the vehicle pattern from the captured image based on the determined vehicle headlight pattern. With such a method and apparatus, the ROI of a vehicle may be acquired from the image without using the vehicle's bottom shadow.

19 Claims, 8 Drawing Sheets

Fig. 7d
Bottom side

VEHICLE HEADLIGHT DETECTING METHOD AND APPARATUS, AND REGION-OF-INTEREST SEGMENTING METHOD AND APPARATUS

RELATED APPLICATION

The present application claims priority to Chinese Patent Application Number 200710301433.0, filed Dec. 27, 2007, the entirety of which is hereby incorporated by reference.

FIELD OF THE INVENTION

This invention relates to a computer visualization-based method and apparatus for detecting vehicle headlights, and also relates to a region-of-interest (ROI) segmenting method and apparatus.

RELATED ART

In a computer-based, monocular, visualization-based motorcycle detecting system, it is common to segment a ROI potentially including a motorcycle pattern from an image captured by a camera device such as a camcorder based on feature information such as the vehicle's bottom shadow, vertical edge, and horizontal edge.

However, when the motorcycle is close to a target vehicle on which the camera is mounted or the motorcycle is travelling in a tunnel or a shadow caused by buildings, because the feature information of the vehicle's bottom shadow cannot be detected, it is difficult to segment the ROI potentially including the motorcycle pattern, and the detection of the motorcycle may be missed.

SUMMARY

In view of the above problems, an object of one embodiment of the invention is to provide a ROI segmenting method and apparatus which can segment the RIO potentially including the vehicle pattern from an image without using the feature information of vehicle's bottom shadow.

Another object is to provide a vehicle headlight detecting method and apparatus for detecting a vehicle headlight pattern in the image.

To accomplish the above objects, according to one aspect of embodiments of the invention, a method for segmenting a ROI from an image comprises:

performing an edge extracting operation on a captured image to obtain edges of the captured image;

selecting edges meeting predetermined criteria from the obtained edges, the predetermined criteria being the similarity between the region surrounded by the selected edges and the pattern formed by a vehicle headlight in physical reality at a position of the selected edges;

determining the region surrounded by the selected edges within the captured image as a vehicle headlight pattern; and segmenting the ROI potentially including the vehicle pattern from the captured image based on the determined vehicle headlight pattern.

To accomplish the above objects, according to another aspect of embodiments of the invention, a method for detecting a vehicle headlight pattern from an image comprises:

performing an edge extracting operation on a captured image to obtain edges of the captured image;

selecting edges meeting predetermined criteria from the obtained edges, the predetermined criteria being the similarity between the region surrounded by the selected edges and the pattern formed by the vehicle headlight in physical reality at a position of the selected edges; and determining the region surrounded by the selected edges within the captured image as a vehicle pattern.

To accomplish the above objects, according to still another aspect of embodiments of the invention, an apparatus for segmenting a ROI from an image comprises:

an edge extracting module for performing an edge extracting operation on a captured image to obtain edges of the captured image;

a selecting module for selecting edges meeting predetermined criteria from the obtained edges, the predetermined criteria being the similarity between the region surrounded by the selected edges and the pattern formed by a vehicle headlight in physical reality at a position of the selected edges;

a determining module for determining the region surrounded by the selected edges within the captured image as a vehicle headlight pattern; and a segmenting module for segmenting the ROI potentially including the vehicle pattern from the captured image based on the determined vehicle headlight pattern.

To accomplish the above objects, according to another aspect of embodiments of the invention, an apparatus for detecting a vehicle headlight pattern from an image comprises:

an edge extracting module for performing an edge extracting operation on a captured image to obtain edges of the captured image;

a selecting module for selecting edges meeting predetermined criteria from the obtained edges, the predetermined criteria being the similarity between the region surrounded by the selected edges and the pattern formed by the vehicle headlight in physical reality at a position of the selected edges; and a determining module for determining the region surrounded by the selected edges within the captured image as a vehicle headlight pattern.

DETAILED DESCRIPTION OF THE INVENTION

In accordance with one aspect of the invention, a headlight pattern of a vehicle is extracted from a captured image, then the ROI (Region of Interest) potentially including the vehicle pattern is segmented from the captured image based on the extracted headlight pattern.

Figure 1:
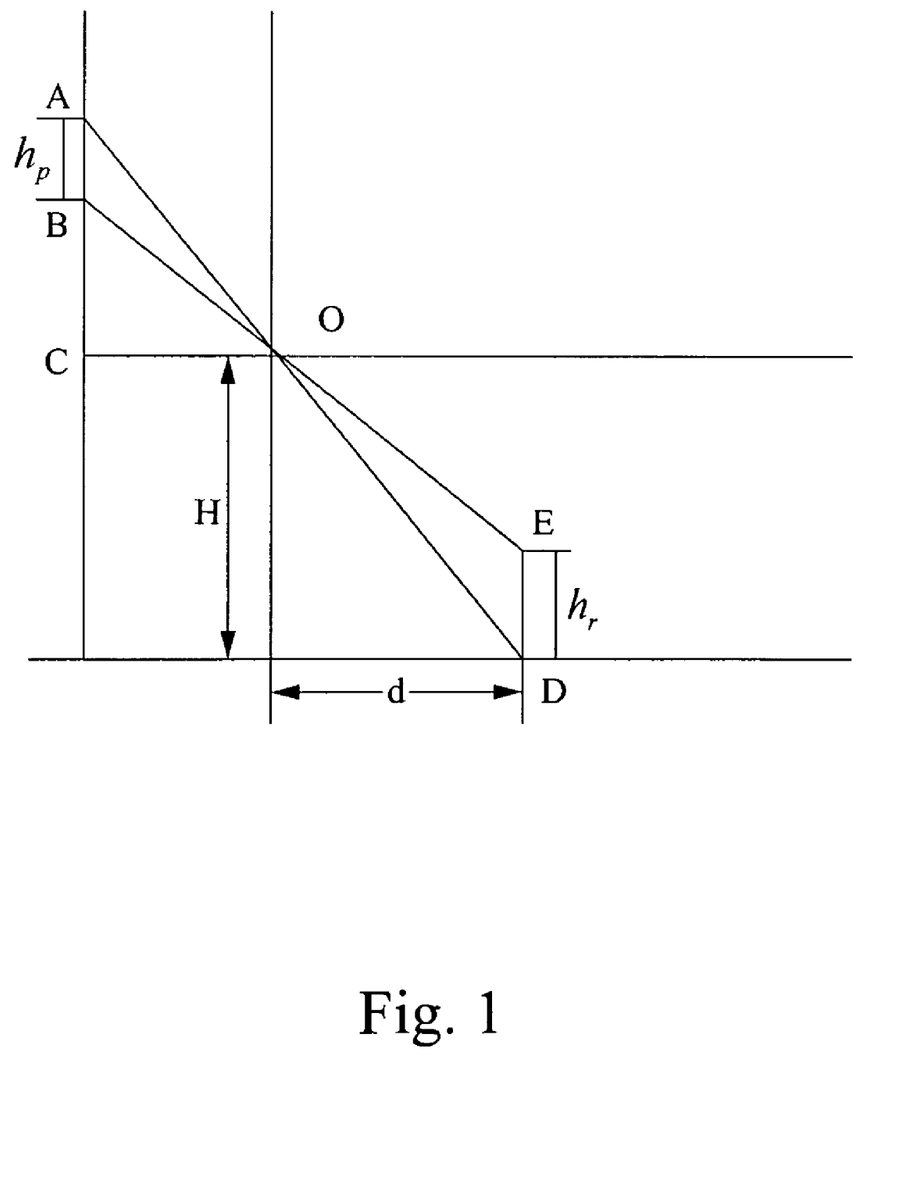
FIG. 1 shows a schematic diagram of a perspective principle.

First, a perspective principle to be adopted in some embodiments of the invention will be described. Referring to FIG. 1, the relationship between the actual height DE ($h_r$) in physical reality and the pixels' height AB ($h_p$) formed within the captured image is as follows:

$$\frac{AB \times d_y}{DE} = \frac{OC}{d} \quad (1)$$

An equation (2) is obtained by transforming the equation (1):

$$AB = \frac{OC \times DE}{d} \times \frac{1}{d_y} = \frac{f \times h_r}{d} \times \frac{1}{d_y}, \quad (2)$$

i.e., $h_p = \frac{f \times h_r}{d} \times \frac{1}{d_y}$ where DE represents the height from the bottom edge of the vehicle headlight to the ground; AB represents the pixels' height from the bottom edge of the vehicle headlight pattern in the captured image to the bottom side of the captured image; OC represents the focal length f of the camera; $d_y$ represents the tangential distortion of the camera; d represents the distance between a target vehicle and the camera in physical reality, which corresponds to a depth $d_p$ of the bottom side of the vehicle in the image (i.e., the distance between the bottom side of the vehicle and the bottom side of the image). The relationship between d and $d_p$ is as follows:

$$d = \frac{H - d_y}{d_p - Vanishingline} \quad (3)$$

where H represents the height from the camera to the ground, and the Vanishingline represents the pixels' distance from the road vanishing line to the bottom side of the image.

Hereinafter, taking a motorcycle as an example of the vehicle, a ROI segmenting method according to an embodiment of the invention will be described in conjunction with FIG. 2.

Figure 2:
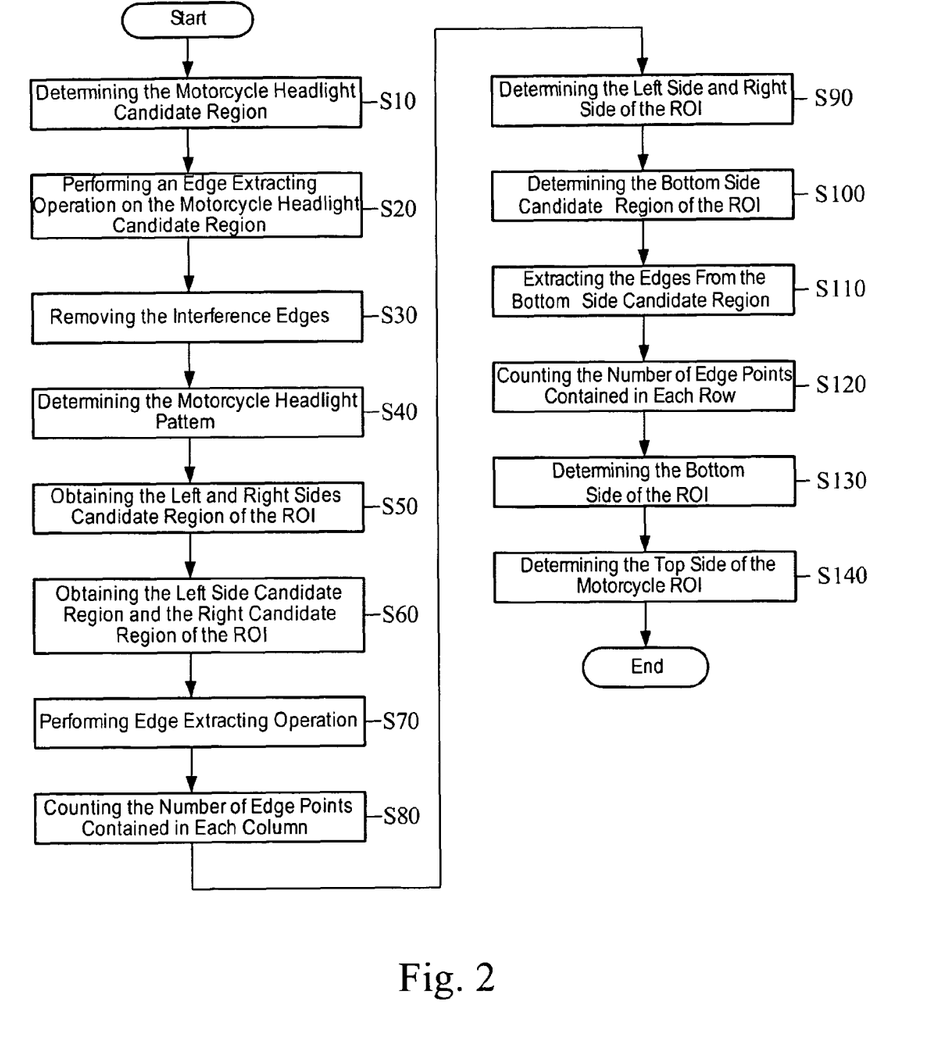
FIG. 2 is a flowchart of a method for segmenting a ROI from an image in accordance with an embodiment of the invention.
Figure 3A:
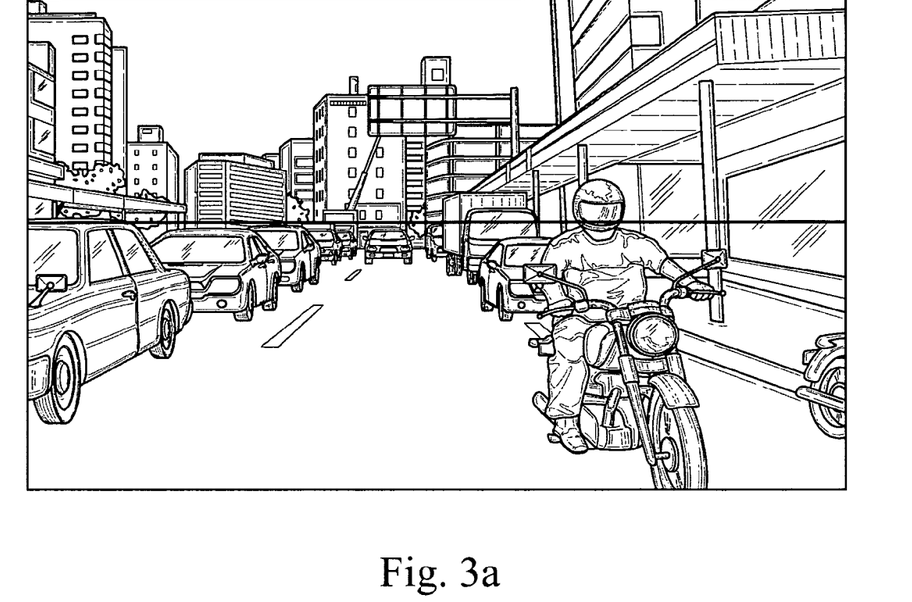
FIG. 3a shows an example of a captured image in accordance with an embodiment of the invention.
Figure 3B:
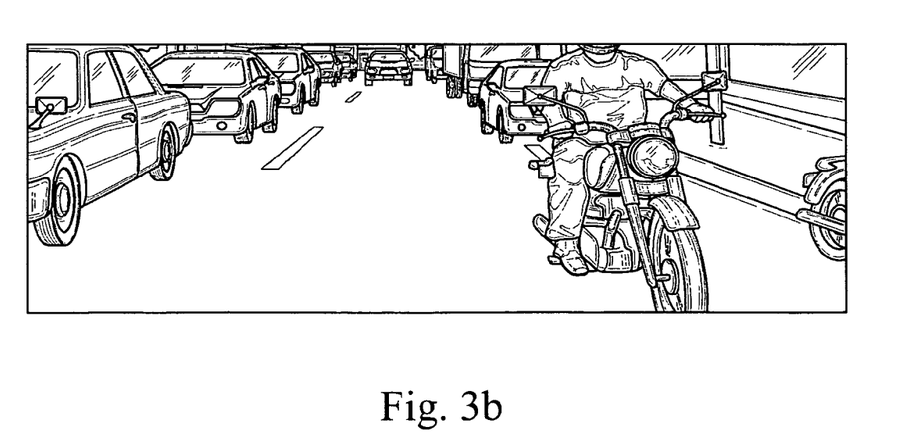
FIG. 3b shows a schematic diagram of a vehicle headlight candidate region in accordance with an embodiment of the invention.

Referring to FIG. 2, at step S10, a motorcycle headlight candidate region, i.e., an image region potentially including the motorcycle headlight pattern, is determined from the image captured by a camera such as the camcorder. As the motorcycle headlight normally does not appear beyond the road vanishing line in the image when the road is flat (referring to FIG. 3a), an image portion under the road vanishing line within the captured image may be selected as the motorcycle headlight candidate region (referring to FIG. 3b). In consideration of the influence of the road gradient, in the present embodiment, the position of $\Delta T = 10$ pixels extended upwards from the road vanishing line within the captured image is determined to be the top edge of the motorcycle headlight candidate region.

Figure 4:
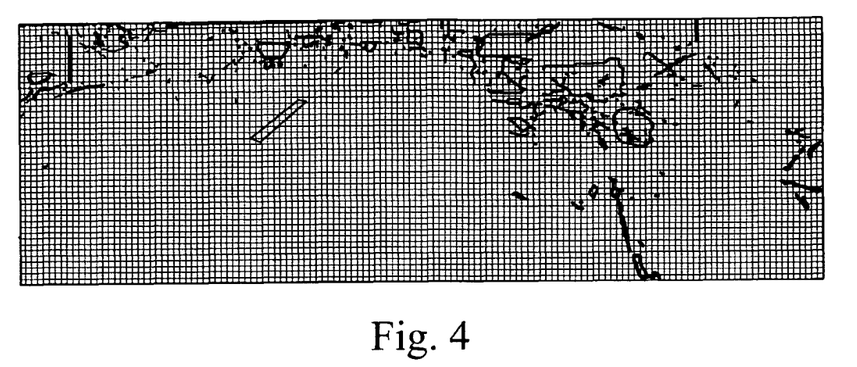
FIG. 4 shows a schematic diagram of extracted edges in accordance with an embodiment of the invention.

Then, at step S20, an edge extracting operation is performed on the determined motorcycle headlight candidate region by a known method such as Canny, Sobel or SUSAN. Referring to FIG. 4, in the present embodiment, the SUSAN method is preferably adopted to directly extract the edges from the determined motorcycle headlight candidate region (i.e., based on the RGB color space of the determined motorcycle headlight candidate region).

Figure 5A:
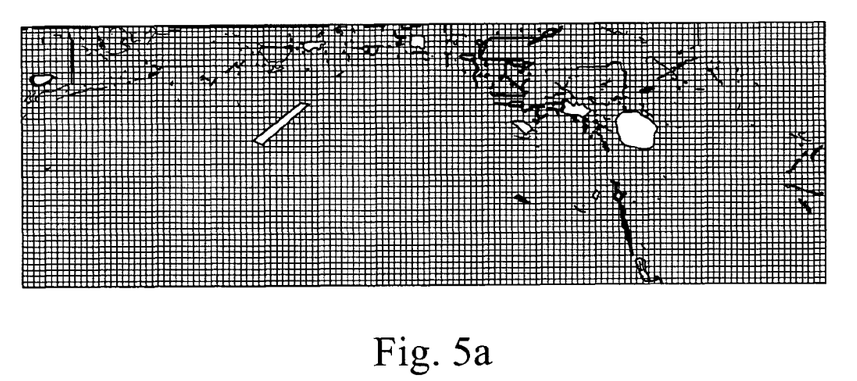
FIG. 5a shows a schematic diagram of an image after a filling operation in accordance with an embodiment of the invention.
Figure 5B:
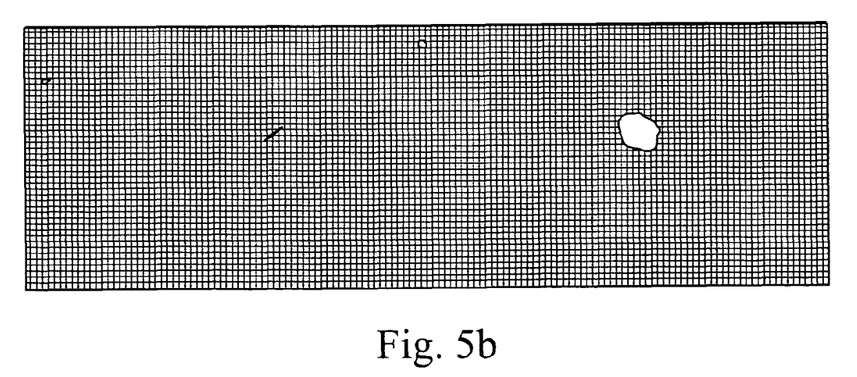
FIG. 5b shows a schematic diagram of an image after an eroding operation in accordance with an embodiment of the invention.

Next, at step S30, interference edges, for example, edges without a closed contour and/or edges featuring a closed contour with its perimeter less than the corresponding perimeter within the captured image of the smallest vehicle headlight in physical reality, are removed from the extracted edges. In the present embodiment, some operations derived from the mathematical morphology are adopted to remove the edges without a closed contour and/or the edges featuring a closed contour with its perimeter less than the corresponding perimeter within the captured image of the smallest vehicle headlight in physical reality. Specifically, the edges featuring the closed contour within the captured image are filled (referring to FIG. 5a), then an eroding operation is performed on the determined motorcycle headlight candidate region by adopting a template with its size smaller than the pixels' size of the smallest motorcycle to be identified in the motorcycle headlight candidate region, a round template of 5×5 being adopted herein (referring to FIG. 5b) whereby the edges without a closed contour and/or the edges featuring a closed contour with its perimeter less than the corresponding perimeter within the captured image of the smallest headlight in physical reality are removed. Then a dilating operation is performed on the determined motorcycle headlight candidate region by adopting the template (referring to FIG. 5c).

Figure 5C:
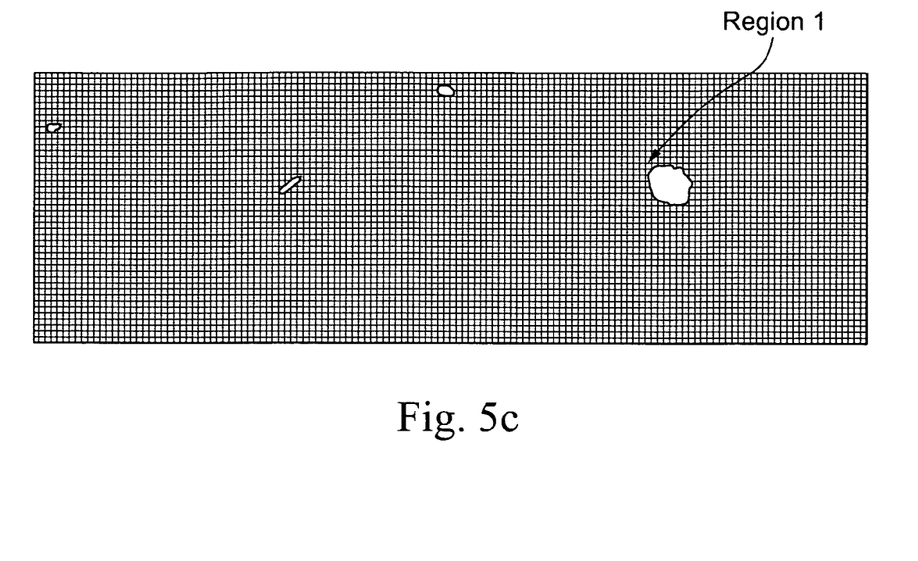
FIG. 5c shows a schematic diagram of an image after a dilating operation in accordance with an embodiment of the invention.

At step S40, a region, enclosed by the edges with its perimeter within a range between a perimeter of the largest motorcycle headlight and a perimeter of the smallest motorcycle headlight and an aspect ratio of its boundary rectangle within a predetermined range, is selected as the motorcycle headlight pattern from the captured edges, as shown by the region 1 in FIG. 5c.

Figure 6A:
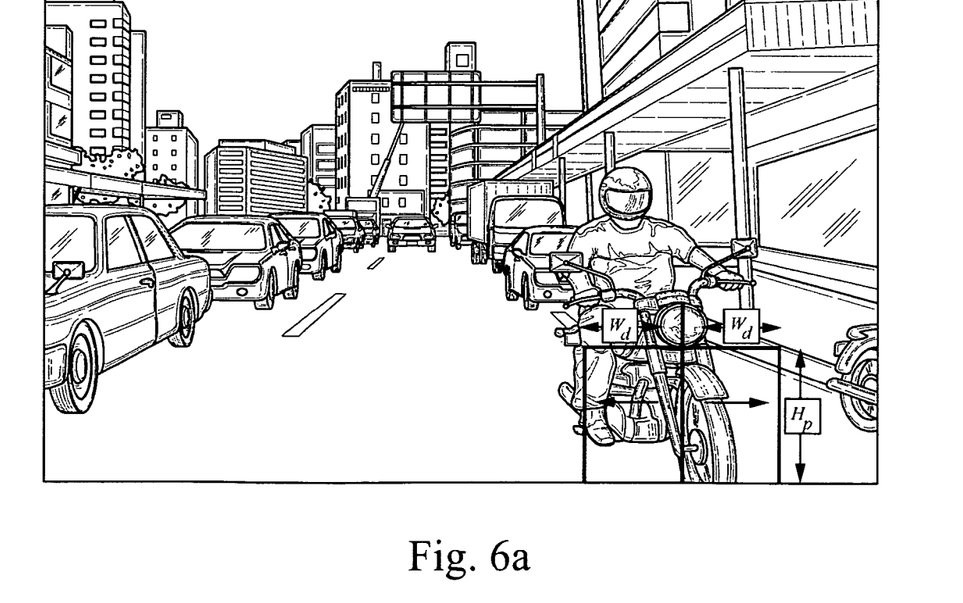
FIG. 6a shows a schematic diagram of a left and right sides candidate region of the ROI in accordance with an embodiment of the invention.

At step S50, a left extension side and a right extension side are obtained by moving the left side and the right side of the determined motorcycle headlight pattern respectively to the left and to the right by a width of $W_d$, and a bottom extension side is obtained by moving the bottom side of the determined motorcycle headlight pattern downwards by a depth of $H_p$, thereby obtaining a left and right sides candidate region $R_m$ potentially including the ROI of the motorcycle (hereinafter referred as the motorcycle ROI), formed by the bottom side, the left extension side, the right extension side, and the bottom extension side of the motorcycle headlight pattern, as shown in FIG. 6a, wherein:

$$W_d = k \times (2 \times R) \quad H_p = t \times (2 \times R).$$

R represents the radius of the motorcycle headlight; k and t represent the empirical constants determined based on the radius of the motorcycle headlight. The coordinates of the candidate region $R_m$ are as follows:

$$\begin{cases} R_{ml} = Cx - R - W_d \\ R_{mr} = Cx + R + W_d \\ R_{mt} = Cy + R \\ R_{mb} = Cy + R + H_p. \end{cases}$$

where ($C_x$, $C_y$) represents the coordinates of the center of the motorcycle headlight, and R represents the radius of the motorcycle headlight.

At step S60, along the vertical line through the center of the motorcycle headlight pattern, the candidate region $R_m$ is segmented into two regions, i.e., the left region and the right region, respectively, as the left side candidate region and the right side candidate region of the motorcycle ROI.

Figure 6B:
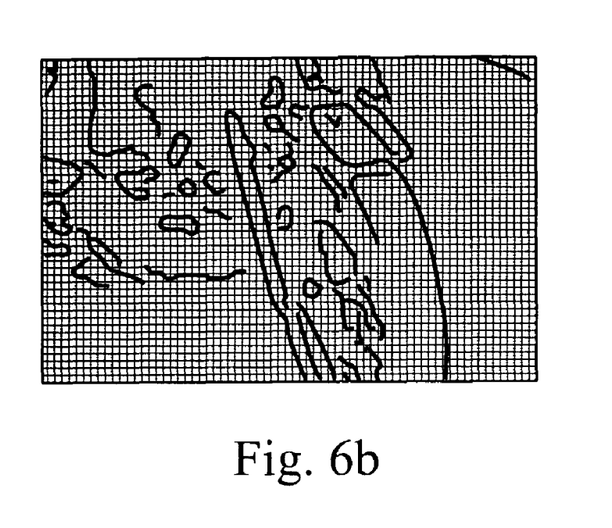
FIG. 6b shows a schematic diagram of edges extracted from a left side candidate region and a right side candidate region of the ROI in accordance with an embodiment of the invention.

At step S70, an edge extracting operation is performed on the left side candidate region and the right side candidate region of the motorcycle ROI with an edge extraction operator such as Canny or Sobel, so as to extract edges from the two candidate regions (i.e., the candidate region $R_m$) as shown in FIG. 6b.

Figure 6C:
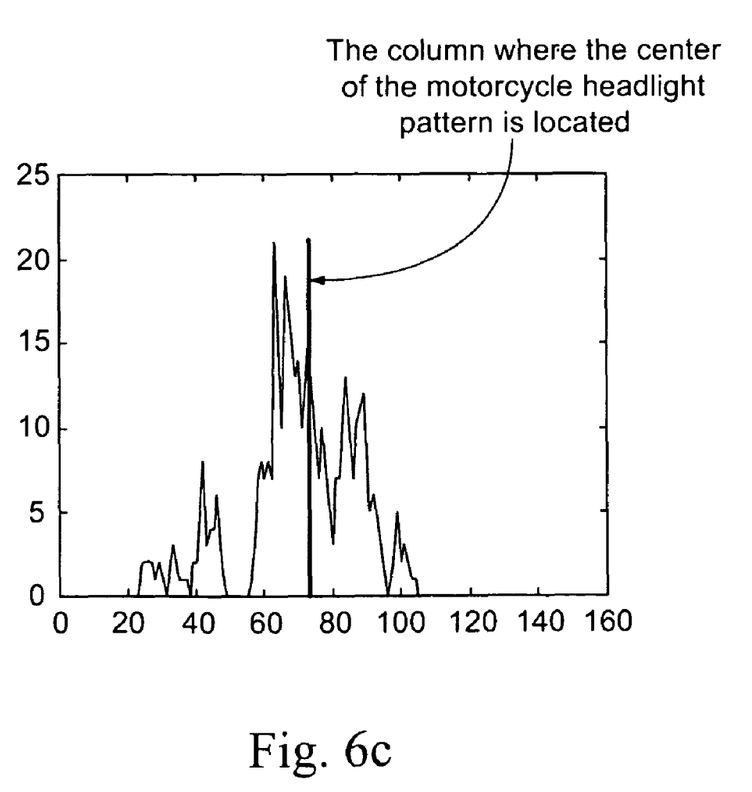
FIG. 6c shows a histogram indicating the number of the edge points contained in each column within the edges of FIG. 6b.

At step S80, the number of the edge points contained in each column within the left and right side candidate regions is counted. FIG. 6c shows a histogram indicating the number of the edge points contained in each column within the edge pattern of FIG. 6b, wherein the abscissa of the histogram represents the positions of each column within the captured image, while the ordinate of the histogram represents the number of the edge points contained in each column.

At step S90, the column containing the most edge points in the left side candidate region is determined to be the left side of the motorcycle ROI, while the column containing the most edge points in the right side candidate region is determined to be the right side of the motorcycle ROI.

If there is no edge extractable in either the left side candidate region or the right side candidate region, the column in one candidate region, being symmetrical with the side of the determined motorcycle ROI in the other candidate region with respect to the center of the motorcycle headlight, is selected as the side of the motorcycle ROI in the one candidate region.

If there is no edge extractable from both of the left side candidate region and the right side candidate region, the left side and the right side of the candidate region $R_m$ are determined to be the left side and the right side of the motorcycle ROI respectively.

Figure 7A:
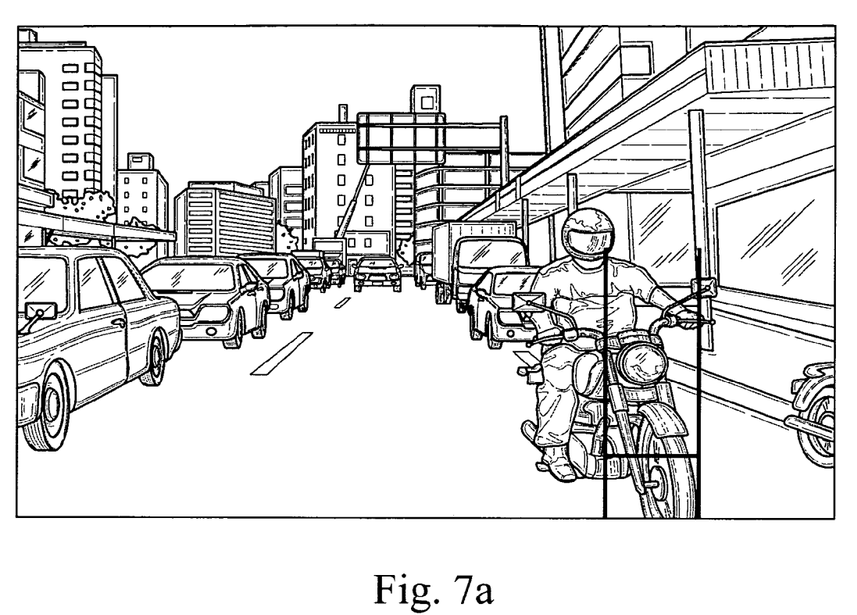
FIG. 7a shows a schematic diagram of a bottom side candidate region of the ROI in accordance with an embodiment of the invention.

At step S100, a bottom side candidate region of the motorcycle ROI is determined. Specifically, the distances $d_p$ between each row within the captured image and the bottom side of the captured image are computed. Then, the actual height $h_r$ in physical reality, corresponding to the pixels' height $h_p$ from each row within the captured image to the bottom side of the motorcycle headlight pattern, is computed in accordance with the above-mentioned equations (2) and (3). Next, a first particular row, whose corresponding actual height $h_r$ equals the maximum height $h_{r\_max}$ from the motorcycle headlight to the ground in physical reality, and a second particular row, whose corresponding actual height $h_r$ equals the minimum height $h_{r\_min}$ from the motorcycle headlight to the ground in physical reality, are found. Finally, the image region formed by the first and second particular rows, and the left and right sides of the motorcycle ROI determined within the captured image is selected as the bottom side candidate region of the motorcycle ROI, as shown in FIG. 7a.

Figure 7B:
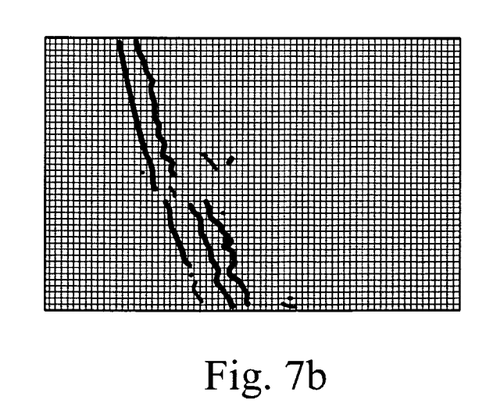
FIG. 7b shows a schematic diagram of edges extracted from the bottom side candidate region of the ROI in accordance with an embodiment of the invention.

At step S110, an edge extracting operation is performed on the bottom side candidate region of the motorcycle ROI by an edge extraction operator such as Canny or Sobel, so as to extract edges from the bottom side candidate region, as shown in FIG. 7b.

Figure 7C:
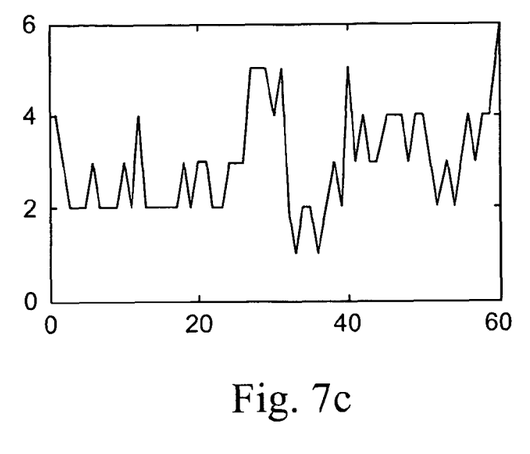
FIG. 7c shows a histogram indicating the number of the edge points contained in each row within the edges of FIG. 7b.

At step S120, the number of the edge points contained in each row within the bottom side candidate region is counted. FIG. 7c shows a histogram indicating the number of the edge points contained in each row within the bottom side candidate region, wherein the abscissa of the histogram represents the positions of each row in the bottom side candidate region, while the ordinate of the histogram represents the number of the edge points contained in each row.

Figure 7D:
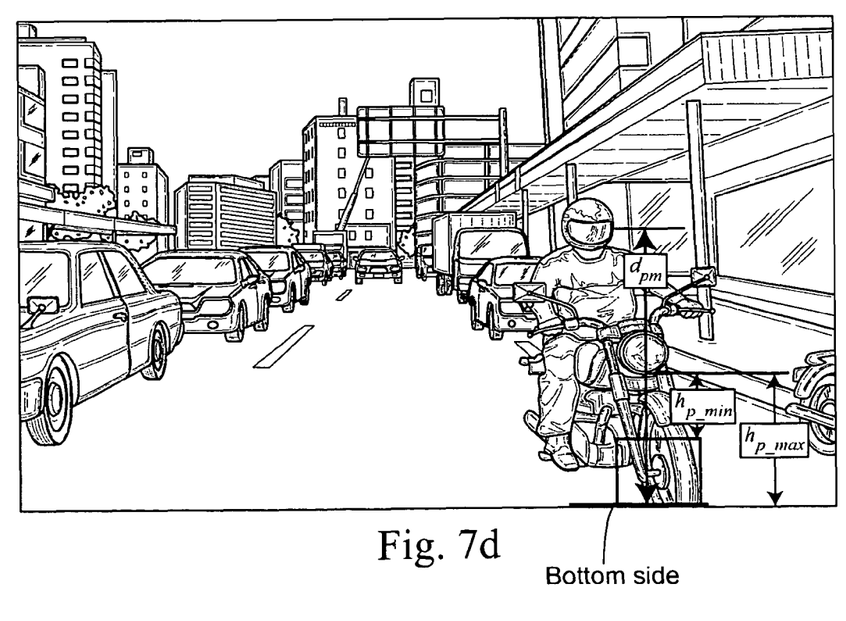
FIG. 7d shows a schematic diagram of the bottom side of the ROI in accordance with an embodiment of the invention.

At step S130, the row containing the most edge points in the bottom side candidate region is determined to be the bottom side of the motorcycle ROI. FIG. 7D shows an example of the bottom side of the motorcycle ROI.

At step S140, the top side of the motorcycle ROI is determined. Specifically, after the bottom side of the motorcycle ROI is obtained, the distance d between the camera and the motorcycle is computed in accordance with equation (3) based on the distance $d_p$ from the bottom side of the captured image to the row where the obtained bottom side is located; then the pixels' height $d_{pm}$ of the motorcycle within the captured image is computed, where the distance from the motorcycle to the camera in physical reality is d:

$$d_{pm} = \frac{f \times h_{motor}}{d} \times \frac{1}{d}.$$

The height of the motorcycle in physical reality is represented by $h_{motor}$, which equals 1.5 m in this embodiment.

Finally, the row which is spaced apart from the bottom side of the motorcycle ROI by the pixels' height $d_{pm}$ is determined to be the top side of the motorcycle ROI.

Although the discussed embodiment presumes that the edge has a closed contour with its perimeter within a range between a perimeter of the largest motorcycle headlight and a perimeter of the smallest motorcycle headlight and an aspect ratio of its boundary rectangle within a predetermined range, so as to determine the similarity between the region surrounded by the edges and the pattern formed by the vehicle headlight in physical reality at the position of the edges, a person skilled in the art will understand that the invention is not limited hereto. In other embodiments of the invention, the similarity between the region surrounded by the edges and the pattern formed by the vehicle headlight in physical reality at the position of the edges may also be determined by judging whether the edges feature a closed contour and whether the difference between the region surrounded by the edges and the invariant moment, the rectangular degree, the circular degree or the fourier descriptor of the vehicle headlight pattern formed at the position of the edges is within a predetermined range. Here, the above-mentioned method of judging the pattern's similarity by adopting the invariant moment, the rectangular degree, the circular degree, the fourier descriptor or the like is known to a person skilled in the image processing field, and therefore the description of such is omitted.

Although the discussed embodiments presume that the image portion below the road vanishing line within the captured image is the vehicle headlight candidate region, a person in the art will understand that the invention is not limited hereto. In other embodiments of the invention, the entire captured image may be selected as the vehicle headlight candidate region.

Although a motorcycle is adopted as an example in the discussed embodiment, a person in the art will understand that the invention is not limited to detecting a motorcycle. In other embodiments of the invention, other vehicles besides a motorcycle may be detected.

The vehicle headlight detecting method and the ROI segmenting method of this invention may be implemented either in software controlling the operation of a processor or a combination of software and hardware.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. A method for segmenting a region of interest (ROI) from an image, comprising:
    performing an edge extracting operation on a captured image to obtain edges of the captured image;
    selecting edges meeting predetermined criteria from the obtained edges, the predetermined criteria being the similarity between the region surrounded by the selected edges and the pattern formed by a vehicle headlight in physical reality at a position of the selected edges;
    determining the region surrounded by the selected edges within the captured image as a vehicle headlight pattern; and
    segmenting the ROI potentially including the vehicle pattern from the captured image based on the determined vehicle headlight pattern.

2. The method according to claim 1, wherein the act of segmenting further comprises:
    moving the left side and the right side of the determined vehicle headlight pattern respectively to the left and to the right by a predetermined width to obtain a left extension side and a right extension side, and extending the bottom side of the determined vehicle headlight pattern downwards by a predetermined depth to obtain a bottom extension side;
    extracting edges from a left and right sides candidate region formed by the bottom side, the left extension side, the right extension side, and the bottom extension side of the vehicle headlight pattern;
    computing the number of edge points contained in each column within a left side candidate region and a right side candidate region segmented from the left and right sides candidate region along a vertical line through the center of the motorcycle headlight pattern; and
    determining the columns containing the most edge points in the left side candidate region and in the right side candidate region as the left side and the right side of the ROI, respectively.

3. The method according to claim 2, further comprising:
    if no edges are extractable in either the left side candidate region or the right side candidate region, the column in one candidate region, being symmetrical with the column containing the most edge points in the other candidate region with respect to the center of the motorcycle headlight, is selected as the column containing the most edge points in the one candidate region.

4. The method according to claim 2, further comprising:
    if no edges are extractable from both of the left side candidate region and the right side candidate region, determining the left extension side and the right extension side as the left side and the right side of the ROI respectively.

5. The method according to claim 2, wherein the act of segmenting further comprises:
    determining a bottom side candidate region of the ROI based on the captured image;
    extracting edges from the bottom side candidate region;
    computing the number of edge points contained in each row within the bottom side candidate region; and
    determining the row containing the most edge points in the bottom side candidate region as the bottom side of the ROI.

6. The method according to claim 5, wherein the act of determining the bottom side candidate region further comprises:
    computing the actual height in physical reality corresponding to the pixels' height from each row within the captured image to the bottom side of the vehicle headlight pattern;
    finding a first particular row whose corresponding actual height equals the maximum height from the vehicle headlight to the ground in physical reality, and a second particular row whose corresponding actual height equals the minimum height from the vehicle headlight to the ground in physical reality; and
    determining the region formed by the first particular row, the second particular row, the left side, and the right side of the ROI within the captured image as the bottom side candidate region.

7. The method according to claim 5, wherein the act of segmenting further comprises:
    computing the pixels' height of the vehicle pattern formed by the vehicle in physical reality at a position of the bottom side of the ROI within the captured image; and
    determining a top side of the ROI based on the bottom side of the ROI and the pixels' height of the vehicle pattern.

8. A method for detecting a vehicle headlight pattern from an image, comprising:
    performing an edge extracting operation on a captured image to obtain edges of the captured image;
    selecting edges meeting predetermined criteria from the obtained edges, the predetermined criteria being the similarity between the region surrounded by the selected edges and the pattern formed by the vehicle headlight in physical reality at a position of the selected edges; and
    determining the region surrounded by the selected edges within the captured image as a vehicle headlight pattern.

9. The method according to claim 8, the predetermined criteria comprising:
    the selected edges featuring a closed contour, with its perimeter within a range between a perimeter of the smallest headlight and a perimeter of the largest headlight and an aspect ratio of its boundary rectangle within a predetermined range.

10. The method according to claim 8, further comprising the following act before the selecting act:

removing edges without a closed contour and/or edges featuring a closed contour with its perimeter less than the corresponding perimeter within the captured image of the smallest headlight in physical reality from the obtained edges.

11. The method according to claim 10, wherein the act of removing further comprises:

performing a filling operation on the edges featuring a closed contour among the obtained edges;

performing an eroding operation on the captured image by adopting a predetermined template; and performing a dilating operation on the captured image by adopting the predetermined template.

12. The method according to claim 8, wherein the edge extracting operation is performed on an image portion between the vicinity of a road vanishing line within the captured image and the bottom side of the captured image.

13. An apparatus for segmenting a region of interest (ROI) from an image, comprising:

an edge extracting module for performing an edge extracting operation on at least a portion of a captured image to obtain edges of the captured image;

a selecting module for selecting edges meeting predetermined criteria from the obtained edges, the predetermined criteria being the similarity between the region surrounded by the selected edges and the pattern formed by a vehicle headlight in physical reality at a position of the selected edges;

a determining module for determining the region surrounded by the selected edges within the captured image as a vehicle headlight pattern; and a segmenting module for segmenting the ROI potentially including the vehicle pattern from the captured image based on the determined vehicle headlight pattern.

14. The apparatus according to claim 13, wherein the segmenting module further comprises:

an extending unit, for moving the left side and the right side of the determined vehicle headlight pattern respectively to the left and the right by a predetermined width to obtain a left extension side and a right extension side, and moving the bottom side of the determined vehicle headlight pattern downwards by a predetermined depth to obtain a bottom extension side;

a candidate region edge extracting unit for extracting edges from a left and right sides candidate region formed by the bottom side, the left extension side, the right extension side, and the bottom extension side of the vehicle headlight pattern;

a computing unit for computing the number of edge points contained in each column within a left side candidate region and a right side candidate region segmented from the left and right sides candidate region along a vertical line through the center of the vehicle headlight pattern; and a determining unit for determining the columns containing the most edge points in the left side candidate region and the right side candidate region as the left side and right side of the ROI respectively.

15. The apparatus according to claim 14, wherein:

if no edges are extractable from either the left side candidate region or the right side candidate region, the computing unit computes the column in one candidate region, being symmetrical with the column containing the most edge points in the other candidate region with respect to the vertical line, as the column containing the most edge points in the one candidate region.

16. The apparatus according to claim 14, wherein:

if no edges are extractable from both of the left side candidate region and the right side candidate region, the determining unit determines the left extension side and the right extension side as the left side and the right side of the ROI respectively.

17. The apparatus according to claim 14, wherein the segmenting module further comprises a bottom side candidate region determining unit for determining a bottom side candidate region of the ROI based on the captured image, wherein:

the candidate region edge extracting unit extracts edges from the bottom side candidate region;

the computing unit computes the number of edge points contained in each row within the bottom side candidate region; and the determining unit determines the row containing the most edge points in the bottom side candidate region as the bottom side of the ROI.

18. The apparatus according to claim 17, wherein the bottom side candidate region determining unit further comprises:

an actual height computing unit for computing the actual height in physical reality corresponding to the pixels' height from each row within the captured image to the bottom side of the vehicle headlight pattern;

a determining unit, for determining a first particular row whose corresponding actual height equals the maximum height from the vehicle headlight to the ground in physical reality, and a second particular row whose corresponding actual height equals the minimum height from the vehicle headlight to the ground in physical reality; and a candidate region determining unit for determining the region formed by the first particular row, the second particular row, the left side, and right side of the ROI within the captured image as the bottom side candidate region.

19. The apparatus according to claim 17, wherein the segmenting module further comprises:

a pixel height computing unit for computing the pixels' height of the vehicle pattern formed by the vehicle in physical reality at a position of the bottom side of the ROI within the captured image; and a top side determining unit, for determining a top side of the ROI based on the bottom side of the ROI and the pixels' height of the vehicle pattern.

* * * * *